United States Patent
Notaro et al.

[19]

[11] Patent Number: 5,810,909

[45] Date of Patent: Sep. 22, 1998

[54] ADSORPTION PROCESS AND SYSTEM USING MULTILAYER ADSORBENT BEDS

[75] Inventors: Frank Notaro, Amherst; Joseph Timothy Mullhaupt, Williamsville; Frederick Wells Leavitt, Amherst; Mark William Ackley, East Aurora, all of N.Y.

[73] Assignee: Praxair Technology, Inc., Danbury, Conn.

[21] Appl. No.: 826,609

[22] Filed: Apr. 3, 1997

Related U.S. Application Data

[63] Continuation of Ser. No. 546,325, Oct. 20, 1995, Pat. No. 5,674,311.

[51] Int. Cl.$^6$ ............................................ B01D 53/047
[52] U.S. Cl. .............................. 95/96; 95/122; 95/130; 95/139; 96/132; 96/133; 96/144
[58] Field of Search ............ 95/96–98, 100–105, 95/117–119, 121, 122, 130, 139; 96/131–133, 144

[56] References Cited

U.S. PATENT DOCUMENTS

| | | | |
|---|---|---|---|
| 3,140,932 | 7/1964 | McKee | 95/130 |
| 3,140,933 | 7/1964 | McKee | 95/130 X |
| 3,689,212 | 9/1972 | Petit et al. | 95/117 X |
| 3,796,022 | 3/1974 | Simonet et al. | 95/130 X |
| 3,866,428 | 2/1975 | Simonet at al. | 95/130 X |
| 3,973,931 | 8/1976 | Collins | 55/58 |
| 4,481,018 | 11/1984 | Coe et al. | 95/130 |
| 4,557,736 | 12/1985 | Sircar et al. | 95/97 |
| 4,859,217 | 8/1989 | Chao | 55/68 |
| 4,950,311 | 8/1990 | White, Jr. | 55/25 |
| 5,074,892 | 12/1991 | Leavitt | 55/25 |
| 5,169,413 | 12/1992 | Leavitt | 55/25 |

FOREIGN PATENT DOCUMENTS

| | | |
|---|---|---|
| 0512781 | 11/1992 | European Pat. Off. . |
| 0154690 | 4/1982 | Germany . |
| 55-061915 | 5/1980 | Japan ... 95/96 |
| 61-025640 | 2/1986 | Japan ... 95/121 |
| 03-040902 | 2/1991 | Japan ... 95/117 |
| 04-293513 | 10/1992 | Japan ... 95/96 |

*Primary Examiner*—Robert Spitzer
*Attorney, Agent, or Firm*—Robert J. Follett

[57] ABSTRACT

An adsorption process and system for the selective adsorption of a more readily adsorbable component, such as nitrogen, as from air or other feed gas mixture is carried out using a composite adsorbent bed containing different adsorbent materials positioned in separate zones in which the temperature conditions favor adsorption performance of the particular adsorbent material under applicable processing conditions in each zone. A method for the selection of the adsorbent materials is based on Adsorption Figure of Merit values.

2 Claims, 5 Drawing Sheets

ADSORPTION PROCESS AND SYSTEM USING MULTILAYER ADSORBENT BEDS

This application is a continuation of prior U.S. application Ser. No. 08/546,325 Filing Date Oct. 20, 1995, now U.S. Pat. No. 5,674,311.

BACKGROUND OF THE INVENTION

1. Field of the Invention

The present invention relates in general to the separation of gas mixtures by adsorption based on differences in the polar or polarizable characteristics of the constituents of the mixture. More particularly the invention relates to pressure swing adsorption (PSA) separation processes in which the fixed adsorbent bed comprises at least two zones each containing an adsorbent having a chemical composition and adsorptive strength different from the adsorbent in the adjacent zone, the adsorbent in each zone being selected with reference to the longitudinal temperature variations induced in the bed by virtue of the operation of the PSA process. In general, the adsorbent having the stronger adsorption affinity for the more polar or polarizable constituent(s) of the gas mixture is located in a bed zone having the higher temperature.

2. Description of the Prior Art

Pressure-swing adsorption (PSA) gas separation processes are widely practiced for relatively low product rate applications. The separation of nitrogen from gas mixtures such as air by cryogenic distillation is cost effective only where very large quantities of nitrogen and/or oxygen are to be utilized, and accordingly, alternative separation processes such as PSA are in considerable demand. A large number of air separation processes utilizing zeolitic molecular sieve adsorbents have been proposed over the past thirty or so years. Because the nitrogen molecule is slightly larger than the oxygen molecule (kinetic diameters of 3.64 Å and 3.46 Å, respectively) and because the pore openings of zeolite crystals can be modified by cation exchange and other techniques, PSA separations relying upon a kinetic effect have been proposed. The process described in East German Patent 0 154 690, employing a highly lithium exchanged form of zeolite A as the adsorbent for selectively adsorbing oxygen, is of this type. Much more common, however, are the $N_2$—$O_2$ separation processes using large-pore zeolite adsorbents freely accessible by both oxygen and nitrogen by virtue of the interaction of the zeolitic cations with the larger quadrupole moment of the nitrogen molecule. Representative of these processes are those proposed by McKee in U.S. Pat. No. 3,140,932 and U.S. Pat. No. 3,140,933 in which the adsorbents are the strontium, barium, nickel or lithium exchanged forms of zeolite X. In U.S. Pat. No. 4,557,736, to Sircar et al proposed the use of mixed divalent cation forms of zeolite X containing from 5 to 40 percent $Ca^{++}$ ions and 60 to 95 percent $Sr^{++}$ ions. Coe et al, in U.S. Pat. No. 4,481,018, proposed that, provided adsorbent activation conditions were properly maintained, the polyvalent cation form of faujasite-type zeolites, particularly the $Mg^{++}$, $Ca^{++}$, $Sr^{++}$ and $Ba^{++}$ forms, are superior adsorbents for separating nitrogen from air. A more recent discovery by C. C. Chao (U.S. Pat. No. 4,859,217) employs zeolite X ion-exchanged to more than 88 equivalent percent with lithium cations is surprisingly effective in air separation at a temperature in the range of 15° C. to 70° C. and a pressure of from 50 to 10,000 torr. In addition to zeolite X, many other zeolite species (both synthetic and natural) have been used, or suggested for use, in air separations, notably chabazite and zeolite A.

As is apparent from the aforementioned prior art disclosure, the selection of an adsorbent for PSA air separation has been largely empirical. Not only is the nature of the interaction between the zeolite cations and the adsorbate not fully understood, but neither are the effects of the process conditions of temperature, pressure and feedstock chemical composition. To compound the problem is the fact that the operation of the PSA process itself can create significant temperature deviations in the fixed adsorbent bed from the ambient or feedstock temperature so that, in most practical systems, there are relatively large thermal gradients. Accordingly, an adsorbent selected on the basis of a particular operating temperature may not be well-suited for use in portions of the bed having a different temperature. EPA 0512 781 A1 relates to the efficiency of nitrogen removal by adsorption, but does not consider the coupled effects of adsorbent material selection and process conditions. Despite this circumstance, for single separations, i.e. $N_2$ from $O_2$ in a mixture essentially free of other strongly sorbable substances such as $CO_2$ or $H_2O$, the almost universal practice is to use a single adsorbent composition. One exception is disclosed in the Toussaint patent in U.S. Pat. No. 5,203,887, wherein a composite bed containing an adsorbent having a high nitrogen selectivity and capacity in a zone at the feed end of the bed and a different adsorbent of lesser selectivity and capacity, under the same conditions, at the discharge end, are employed. The adsorbent zones are positioned within the bed only for purposes of improving the economics of the process, notably a reduction in adsorbent cost and power requirements. However, temperature gradients within the adsorption bed were not considered in the Toussaint process. There are, of course, many instances in the prior art in which air separation processes are carried out in composite beds containing an adsorbent zone serving as a prepurifier for the removal of water, carbon dioxide and other contaminants from the feed air stream, as, for example, described in U.S. Pat. No. 4,950,311 of White and U.S. Pat. No. 5,169,413 of Leavitt.

SUMMARY OF THE INVENTION

It has now been discovered that temperature gradients in a PSA adsorption bed produced as a consequence of normal operation involving the separation of nitrogen from less polar or polarizable substances, such as oxygen and argon in air separation, can be utilized to advantage by employing a composite bed containing at least two zones of different adsorbents, each adsorbent being confined to a zone within the bed in which the conditions of temperature and adsorbate concentration favor the performance of the adsorbent in that zone as measured by its attainable reflux ratio and by the "Adsorption Figure of Merit", which is the product of the delta nitrogen loading, the selectivity at adsorption conditions and the selectivity ratio, as described in further detail below.

Various adsorbents suitable for this invention range from strong to weak adsorbents with respect to the arbitrary temperature. The main thrust of this invention is to provide a bed optimally using two or more of these adsorbents in the appropriate range of temperatures.

The strength of a given adsorbent is defined in terms of the separation task and the local operating conditions. In a given separation task, the adsorbent is required to selectively adsorb a set of one or more more-strongly adsorbed gases, i.e. the more selectively adsorbable components of a feed gas mixture, from a set of one or more less-strongly adsorbed gases, i.e. the less selectively adsorbable components of said feed gas mixture. For a given set of pressure and temperature conditions, a strong adsorbent is one that very readily adsorbs said more strongly adsorbable gases, i.e. the more selectively adsorbable components, during the first process step but that will not readily release them during the second process step. For the same set of pressure and temperature conditions, a weak adsorbent is one that only weakly adsorbs the more-strongly adsorbed gases during the first process step. An efficient adsorbent would lie between the two extremes; it would adsorb those gases moderately well and would then desorb them moderately well.

By careful selection, an adsorbent bed can be optimized by using layers of different adsorbents for parts of the bed that tend to operate at different temperature levels. Since lower temperatures tend to make adsorbents stronger, weaker adsorbents are employed for those regions that will operate at lower temperatures. Conversely, stronger adsorbents are used for those regions that will operate at higher temperatures. If there were large pressure gradients in a bed, this factor could be taken into consideration in selecting adsorbents for the layers in the bed.

Accordingly, the present invention is defined as an improvement in a PSA process and related system for the separation of a more selectively adsorbable component from a feed gas mixture, i.e. nitrogen from admixture with less polar or polarizable substances, wherein such feed mixture in the vapor phase is contacted in a fixed adsorbent bed containing adsorbent material selective for the adsorption of nitrogen or other more readily adsorbable component, by means of the cyclic steps comprising;

(a) adsorption, during which the feed mixture is passed into the bed in contact with the adsorbent and nitrogen is selectively adsorbed and the less polar or polarizable substance is recovered from the discharge end of the bed; and (b) depressurization, during which the passage of the feed mixture into the bed is discontinued and the pressure in the bed is reduced to desorb and recover the nitrogen adsorbate as a product; the cyclic operation of steps (a) and (b) producing thermal gradients within said adsorption bed, the improvement which comprises employing as the fixed adsorbent bed a composite bed containing at least two different adsorbents selective for the adsorption of nitrogen, each of which is confined to a zone within the bed in which the temperature conditions favor the performance of that adsorbent as measured by its AFM value under the particular process conditions applicable to said zone, including its attainable reflux ratio.

DETAILED DESCRIPTION OF THE INVENTION

The invention is based on a recognition that both adsorbent characteristics and pressure swing adsorption process conditions are responsible for the thermal gradients found to exist in an adsorbent bed during the adsorption-desorption-repressurization process sequence of pressure swing adsorption operations. Such thermal gradients are continuous throughout the adsorbent bed, and there is no single temperature, especially near the feed inlet of the bed, that characterizes any part of the adsorbent bed, i.e. where the size of said part of the adsorbent bed is more than a very small fraction of the overall adsorbent bed. In addition, the temperature of the adsorbent material fluctuates at any given location within the adsorbent bed over the course of the sequence of processing steps that constitute a processing cycle for any given pressure swing adsorption process and system. The invention, as described herein with respect to particular embodiments, is applicable to a wide range of adsorbent materials, feed gas mixtures to be separated, and processing conditions, with the invention being applicable to pressure swing adsorption operations carried out at ambient temperatures, or at temperatures below or above ambient temperatures.

The gas mixtures suitably treated in accordance with the present process and system are those in which a more readily adsorbable component, e.g. nitrogen, is in admixture with a less readily adsorbable component, i.e. one or more less polar or polarizable constituents such as oxygen, helium, hydrogen, argon, neon and the like. By far the greatest commercial interest is in the separation of nitrogen from mixtures with oxygen either as a binary mixture or in combination with the other constituents of air having a lower polarity than nitrogen. Since air contains water and carbon dioxide which are highly polar, these compounds are ordinarily removed prior to separation of nitrogen and oxygen using the present process. While the invention will be further described and illustrated with reference to $N_2$—$O_2$ separation, it will be understood that other separations can be accomplished in the same or similar manner.

The adsorbent compositions employed can be any of those well-known in the art which have adsorptive selectivities for nitrogen over the other and less polar or polarizable constituents of the gas mixture from which nitrogen is to be separated. These include synthetic and natural zeolites, activated aluminas, silica gels, adsorbent carbons and adsorbent clays. Preferred adsorbents are the zeolitic molecular sieves having pores large enough to be freely accessible by nitrogen and other gas mixture components, and having large internal void volumes also accessible to the adsorbate molecules. Among the preferred zeolite molecular sieves are the various cationic forms of the well-known zeolite X, zeolite A, and chabazite.

The process conditions can be any combination of temperature and pressure known or found by those skilled in the art to be suitable for nitrogen PSA processes. Feed gas pressures and temperatures vary widely and are dependent in large part upon the particular adsorbents involved. Commonly a feed temperature can be within the range of 50° C. to −150° C., and the feed pressure within the range of 0.5 to 10 atmospheres. In general the most advantageous temperature and pressure conditions are selected in view of the adsorbent to be employed. The process conditions for a specific adsorbent found in the prior art are largely empirical, however, and are rarely disclosed in terms other than preferred ranges of temperature and pressure for use with a given adsorbent with a specified range of chemical composition. The experimental data available for particular adsorbents in the prior art is, on the other hand, very extensive, and in some instances can provide the information necessary to design an adsorption process within the scope of the present invention given the teachings of the present disclosure.

It is helpful, but not sufficient, for an adsorbent to have a high nitrogen loading and a high selectivity for nitrogen. The performance has been found to be more strongly related to three other factors:

1) delta nitrogen loading—nitrogen loading at the adsorption conditions minus the nitrogen loading at the desorption conditions;

2) selectivity at the adsorption conditions;

3) selectivity ratio—the selectivity at the adsorption conditions divided by the selectivity at the desorption conditions.

Good performance is closely related to the product of these three factors—the Adsorption Figure of Merit, i.e. AFM.

The AFM is evaluated by establishing the adsorption conditions and the desorption pressure. Several sets of conditions, each including adsorption and desorption pressures and adsorption feed temperature, have been used in the examples below. A simple feed composition of 78% nitrogen and 22% oxygen has been used in the examples.

During the depressurization and backpurging of the desorption process, the temperature falls and the concentration of nitrogen normally rises. For calculations of AFM, the fall in temperature has been neglected (although it is important) and it has been assumed that the nitrogen concentration rises to 95%. This approach usually provides good direction in selecting the better adsorbents for a particular set of operating conditions. It would, however, tend to overestimate the performance of any adsorbents with unusually large heats of adsorption.

When the pressures, temperatures, and gas compositions have been set, nitrogen and oxygen loadings are evaluated at adsorption and desorption conditions by multicomponent adsorption equilibrium equations.

Delta nitrogen loading is defined:

$$\Delta N_2 = L_{N_A} - L_{N_D} \quad (1)$$

where, $\Delta N_2$ is the delta nitrogen loading;

$L_{N_A}$ is the nitrogen loading at the adsorption conditions;

$L_{N_D}$ is the nitrogen loading at the desorption conditions.

Selectivity at the adsorption conditions is defined as follows:

$$\alpha_A = \left( \frac{L_{N_A}}{L_{O_A}} \right)\left( \frac{1 - Y_{N_A}}{Y_{N_A}} \right) \quad (2)$$

where, $L_{O_A}$ is the oxygen loading at the adsorption conditions;

$Y_{N_A}$ is the gas phase mole fraction of nitrogen at the adsorption conditions.

Selectivity at the desorption conditions is defined as follows:

$$\alpha_D = \left( \frac{L_{N_D}}{L_{O_D}} \right)\left( \frac{1 - Y_{N_D}}{Y_{N_D}} \right) \quad (3)$$

where $L_{O_D}$ is the oxygen loading at the desorption conditions;

$Y_{N_D}$ is the gas mole fraction of nitrogen at the desorption conditions.

The Adsorption Figure of Merit (AFM) is defined as:

$$AFM = \Delta N_2 \, \alpha_A \left( \frac{\alpha_A}{\alpha_D} \right) \quad (4)$$

During the adsorption process, sensible heat is generated, and during desorption sensible heat is taken up. In a normal PSA process, there is a net forward flow of gas through the bed. There is also a forward flow of enthalpy which results in the spontaneous generation of refrigeration and low-temperature regions within the bed. The amount of internal refrigeration generated depends upon the particular adsorbent involved. The efficiency of the separation process depends upon the adsorbent, the pressures and the temperature. Thus, the adsorbent affects the local temperature, and the temperature, in turn, affects the efficiency of separation. By the use of two or more layers or zones of different adsorbents, the temperature profile can be modified and, more significantly, the local efficiency of the separation process can be enhanced.

It is possible, as mentioned hereinabove, to select the most satisfactory adsorbents for a particular set of process conditions for a gas separation, e.g. a PSA $N_2$—$O_2$ separation, by a more-or-less trial and error approach using information available in the prior art. We have found, however, that the selection process is greatly facilitated by comparing the values of the AFM under the process conditions to be encountered in use in the various zones of the composite PSA fixed bed in which self-induced thermal gradients are generated.

Figure 1:
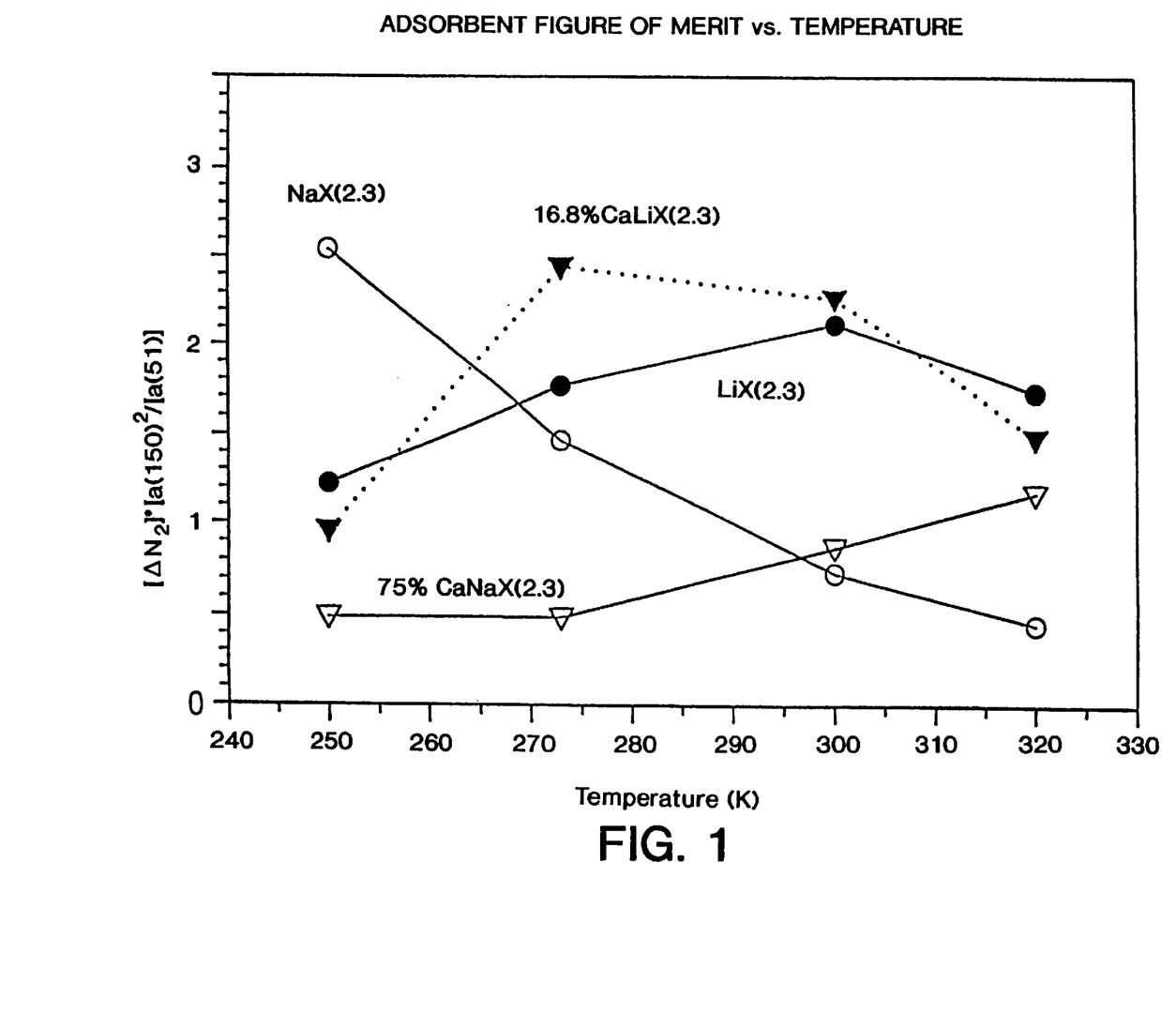
FIG. 1 is a plot showing the correlation between AFM values of various zeolite X adsorbents and adsorption bed temperatures in an oxygen-nitrogen separation process.

The effect of temperature upon the $N_2$—$O_2$ separation performance is revealed through the temperature dependence of the AFM for several selected adsorbents in FIG. 1. The example adsorbents shown are sodium zeolite X having a $Si/Al_2$ molar ratio of 2.3, i.e. (NaX2.3); a highly lithium cation exchanged form thereof containing about 97 equivalent per cent $Li^+$ cations, i.e. (LiX2.3); a calcium-exchanged form thereof containing 75 equivalent percent $Ca^{++}$ cations, i.e. (CaLiX2.3); and a mixed $Ca^{++}$ and $Li^+$ cation exchanged form containing 16.8 equivalent percent $Ca^{++}$ cations, i.e. (CaLiX2.3). In making the computations, it was assumed that the composition of the $N_2$—$O_2$ mixture at the high pressure level was 78% $N_2$ and 22% $O_2$, and 95% $N_2$ and 5% $O2$ at low pressure. The data in FIG. 1 pertain to low-pressure ratio transatmospheric PSA processes operating between 150 kPa and 51 kPa. Examination of other data sets has shown little difference in the ranking of adsorbents when higher pressure ratios are tested. In FIG. 1, the AFM values for each of the four adsorbents in the column, determined directly from experimental laboratory measurements, is plotted as a function of bed temperature. The graph shows that the AFM values for the different adsorbents have different temperature dependencies. At the lowest temperature (250K), the NaX material exhibits a high AFM value, but this value decreases as the temperature is raised. Conversely, the CaNaX adsorbent has a low AFM value at low temperatures, but the AFM increases at higher temperatures. While the AFM value at 320K does not surpass that of the Li-containing adsorbent, the characteristic suggests that this material might be superior at still higher temperatures. The LiX and CaLiX materials have high AFM values above 270K and including the highest temperature plotted, 320K. It is these differences in the temperature dependence of the AFM coupled with the inherent thermal gradients that develop within the adsorbent bed that can be promoted through multiple adsorbent layers to improve the overall air separation process.

Thermal gradients that develop within an adsorbent bed are both material and process-dependent, and may be determined from experiment or from computer simulation. The adsorbent characteristics in FIG. 1 can be applied to generally select an adsorbent or group of adsorbents with the highest AFM values corresponding to the different thermal regions of the bed. The resulting composite bed has an overall higher AFM than would be obtained for a single adsorbent. Furthermore, the overall bed size can be expected to decrease for the composite bed as a result of the higher overall AFM. This approximation can be used for one or more layers.

Having established by the data of FIG. 1 that the optimal performance of each of the NaX2.3, CaLiX2.3, and LiX2.3 adsorbents should be at a temperature different from that of the other two, the potential behavior of these compositions in a PSA $N_2$—$O_2$ separation process was evaluated. In this evaluation, the concentration shifts on depressurization and the minimum reflux ratios that should be required for the PSA process were computed. Because of the coupling of the separation efficiency with temperature, a more sophisticated method is required to determine the optimal depth of the individual layers of adsorbents. A general model was used to correlate the behavior of the real adsorbents. In addition to changes in temperature that occur in the bed, the changes in composition from the feed end to the product end of the bed have also been considered. These calculations were made for two different bed packings. In the first case, i.e. Case 1, the bed was considered to be uniformly packed with adsorbent NaX2.3, a material shown to perform well at low temperatures. Note that, in FIG. 1, LiX2.3 was found to be unsatisfactory at low temperatures, and so is not an option for use in a uniform bed. In the second case, i.e. Case 2, estimates were made of the performance of a three-layer bed comprised of NaX2.3, LiX2.3 and CaLiX2.3. The following Tables, i.e. Tables I and II, give estimated values for the adsorption temperature, the minimum reflux ratio, the practical reflux ratio and the bed depth, for chosen values of the oxygen mol fraction at the adsorption pressure. The minimum reflux ratio used in these examples is defined as the ratio of the backward flow to the net forward flow (forward flow on adsorption minus backward flow on desorption). The practical reflux ratio has been arbitrarily taken to be 10% larger than the minimum value.

CASE 1

Uniform Bed

TABLE I

| | Uniform Bed NaX (2.3) | | | |
|---|---|---|---|---|
| Mol Fraction Oxygen | Adsorption Temperature (K) | Minimum Reflux Ratio | Reflux Ratio | Bed Depth Z (m) |
| 0.219 | 261.04 | 6.38 | 7.02 | 0.00 |
| 0.25 | 271.23 | 5.58 | 6.43 | 0.17 |
| 0.3 | 280.30 | 4.65 | 5.11 | 0.38 |
| 0.4 | 288.14 | 3.58 | 3.94 | 0.69 |
| 0.5 | 292.00 | 2.92 | 3.21 | 0.90 |
| 0.6 | 294.26 | 2.48 | 2.73 | 1.08 |
| 0.7 | 295.72 | 2.17 | 2.39 | 1.26 |
| 0.8 | 296.73 | 1.94 | 2.13 | 1.44 |
| 0.9 | 297.47 | 1.75 | 1.93 | 1.69 |
| 0.95 | 297.78 | 1.66 | 1.83 | 1.9 |
| 0.99 | 298.04 | 1.57 | 1.73 | 2.34 |
| 0.999 | 298.16 | 1.50 | 1.65 | 2.93 |

It is noted that the temperature is lowest at the feed end of the bed. The reflux ratio is also highest at the feed end since this is where most of the nitrogen is removed and where the concentration shift from adsorption (80% of $N_2$) to desorption (near 100% $N_2$) is necessarily modest.

CASE 2

Multilayer Bed

TABLE II

| | Multilayer Bed NaX 2.3, LiX 2.3 and CaLiX 2.3 | | | | |
|---|---|---|---|---|---|
| Mol Fraction Oxygen | Adsorption Temperature (K) | Minimum Reflux Ratio | Reflux Ratio | Bed Depth Z (m) | Adsorbent |
| 0.219 | 261.04 | 6.38 | 7.02 | 0.00 | NaX |
| 0.25 | 271.23 | 5.58 | 6.13 | 0.17 | |
| 0.3 | 280.30 | 4.65 | 5.11 | 0.38 | |
| 0.4 | 288.14 | 3.58 | 3.94 | 0.69 | |
| 0.4 | 282.58 | 3.68 | 4.05 | 0.69 | LiX |
| 0.5 | 288.73 | 2.80 | 3.08 | 0.90 | |
| 0.6 | 282.24 | 2.25 | 2.48 | 1.07 | |
| 0.7 | 294.45 | 1.88 | 2.07 | 1.22 | |
| 0.7 | 294.23 | 1.91 | 2.10 | 1.22 | CaLiX |
| 0.8 | 295.90 | 1.60 | 1.76 | 1.38 | |
| 0.9 | 297.06 | 1.37 | 1.51 | 1.54 | |
| 0.95 | 297.53 | 1.26 | 1.39 | 1.74 | |
| 0.99 | 297.88 | 1.16 | 1.28 | 2.07 | |
| 0.999 | 297.96 | 1.13 | 1.24 | 2.51 | |

It is apparent from the data of Table II that the temperatures are altered above the NaX layer, but that they differ but slightly toward the product end where the temperature approaches 300K, the external feed temperature. The reflux ratios are lower in the upper two layers i.e. for LiX and CaLiX, compared with the uniform bed. These reductions in reflux ratio and in bed length make the multilayer PSA process more efficient than a similar process carried out in a uniform bed with a single adsorbent. More particularly, they lower the amount of adsorbent needed, they lower the local flow rates and local pressure gradients, and they lower the total pressure drops for the bed. Overall, bed depth is reduced from 2.93 m to 2.51 m according to the above examples.

Figure 2:
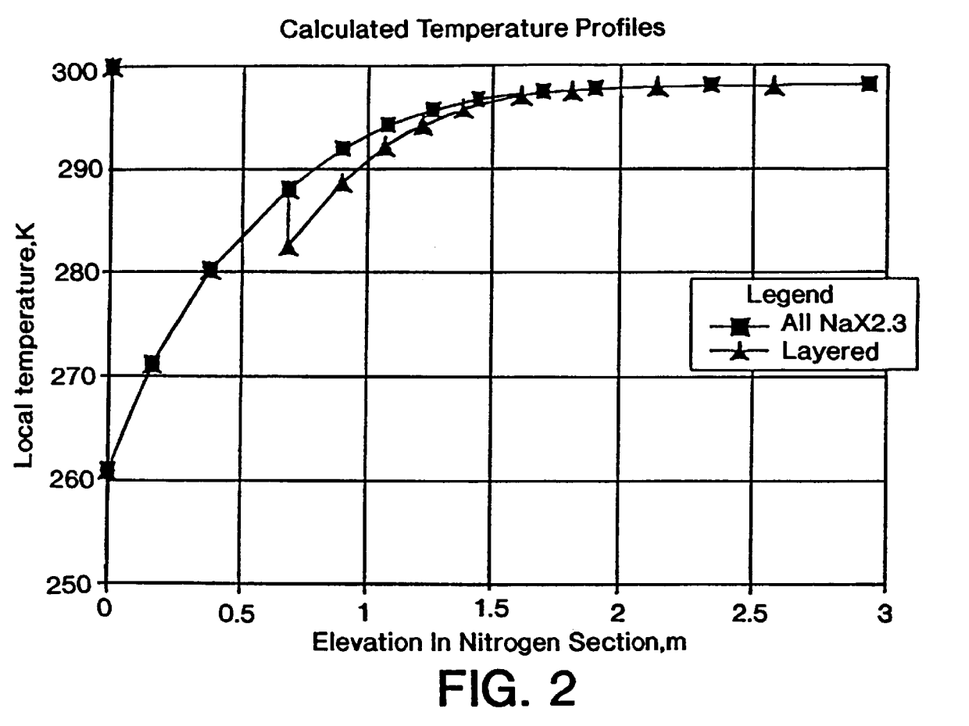
FIG. 2 is a plot showing the local temperatures generated at various points in uniform and composite PSA fixed adsorption beds due to the passage of an oxygen-nitrogen mixture therethrough.
Figure 3:
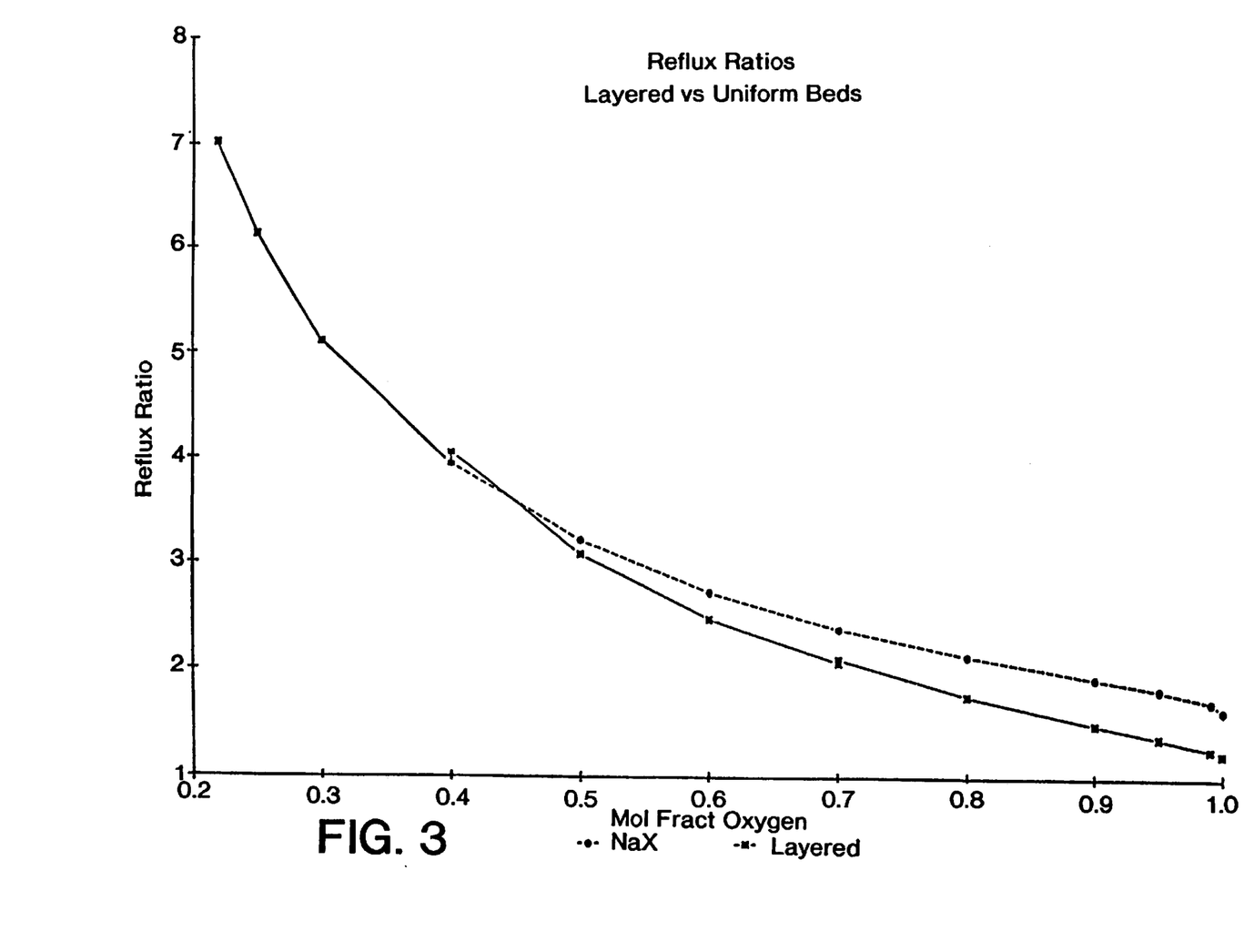
FIG. 3 is a graph in which reflux ratios are plotted against the mol fraction of oxygen at various points along a uniform and a composite fixed adsorbent bed into which a nitrogen-oxygen feed mixture has been passed.
Figure 4:
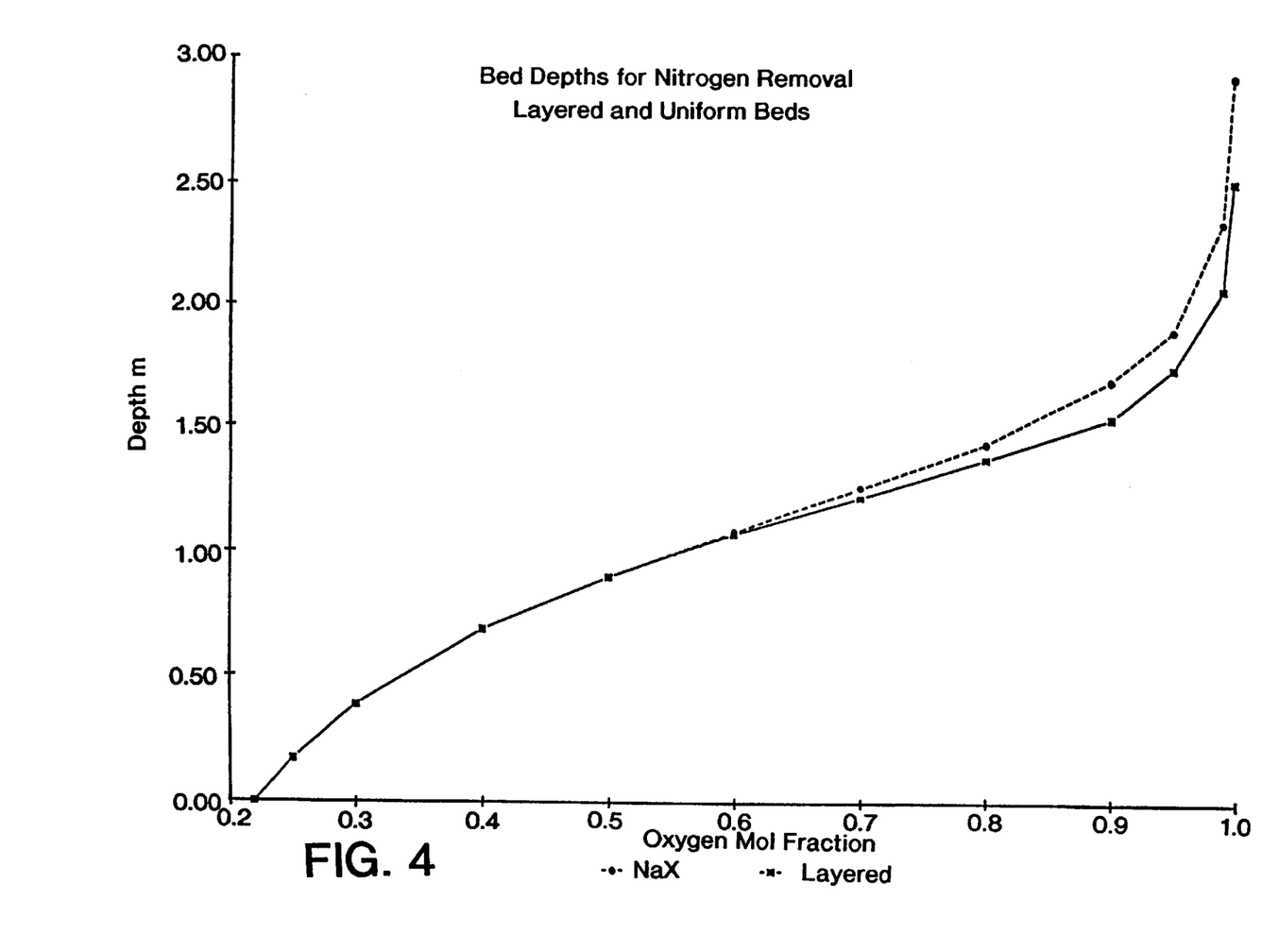
FIG. 4 is a graph in which bed depth is plotted against oxygen mol fraction as a nitrogen-oxygen mixture is passed into a composite and a uniform fixed adsorption bed.

The comparative performance of single-adsorbent and multiple-adsorbent beds is further illustrated in FIG. 2, FIG. 3 and FIG. 4 using the same adsorbents as in the FIG. 1 embodiments.

FIG. 2 shows the temperature profiles. Due to the internally generated refrigeration, the temperature drops to a low value at the feed end of the NaX adsorbent layer. Thereafter, the temperature rises and approaches the external feed temperature of 300K. At the interface between NaX and LiX, there is a second abrupt drop in temperature. A third drop in temperature occurs at the interface between LiX and CaLiX, but this is small and of slight significance.

In FIG. 3, the layered bed reflux ratio is plotted against the mol fraction of oxygen in the forward flowing stream. The reflux ratio generally decreases from the feed end to the product end of the bed. The layered bed is seen to have lower reflux ratios than the bed containing only NaX2.3 in the region with the higher oxygen purities.

In FIG. 4, the required bed depth is plotted against the mol fraction of oxygen. The overall depth of the multilayer bed is seen to be shorter than the length of the uniform bed, particularly when high purity levels of oxygen are required in the product stream.

Figure 5:
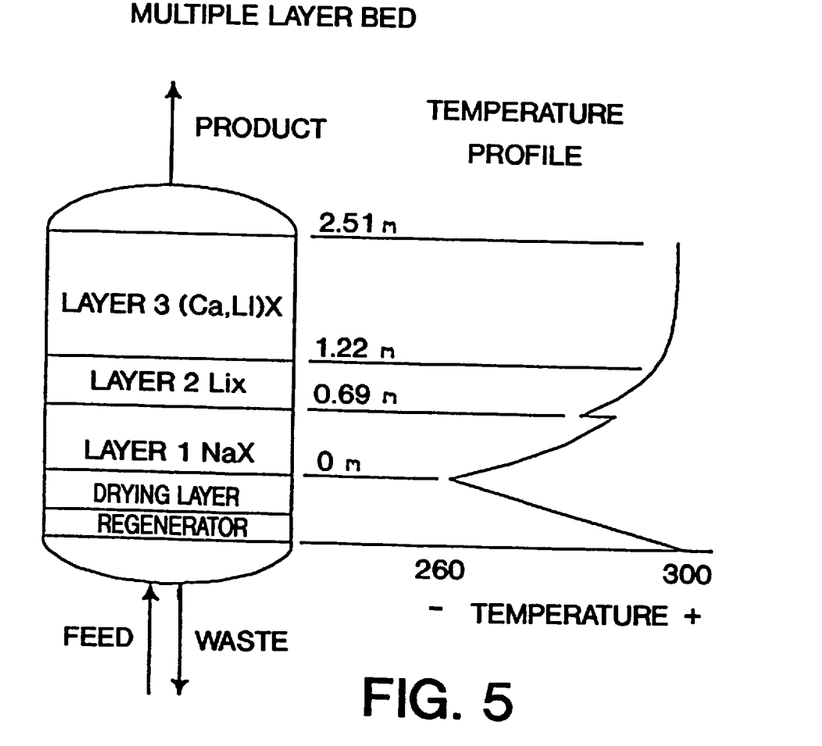
FIG. 5 is a schematic diagram of a composite adsorption bed for use in a PSA process for producing oxygen from an oxygen-nitrogen mixture. A temperature profile of the bed is also shown.

FIG. 5 is an illustration showing schematically how the adsorbents could be deployed in a composite bed for a PSA process to produce oxygen from air. A three-layer, three-adsorbent bed is depicted, using temperatures and layer depths calculated from Table II. In this illustration, it is assumed that the feed enters the bottom of the adsorber and first passes through a regenerator and prepurifier bed which removes water and carbon dioxide from the feed air. The prepurifier bed is assumed to contain alumina or other adsorbent material which efficiently removes water and carbon dioxide. These two bottom regions act also to conserve the internally generated refrigeration and to allow for a smooth transition from the external feed temperature, here taken to be 300K, to the minimum temperature at the bottom of the main bed, which is used for adsorption and removal of nitrogen. The temperature profile shown was taken from FIG. 2, and did not account for any axial diffusion and conduction. In practice, the sharp cusps would be more rounded and smoothed.

The following describes the basis of the method used to calculate the best arrangement of layers of adsorbents within a bed designed to make a given separation.

The pressure swing process consists of two process steps carried out in each column of a system of columns that will contain one or more columns. Each process step in a given column may contain one or more substeps characterized by differences in pressures and in the magnitudes of flow rates.

A column will contain one or more beds in series. Each bed is intended to make a separation. A separation occurs when a first set of components is adsorbed and removed from another set of components from each other. For example, a bed may be used to adsorb and remove nitrogen from a mixture of oxygen and argon. A different bed might also be used to adsorb and remove water vapor and carbon oxides from air. Each column has a first end of the column which may also be called the feed end of the column. Each column has a second end of the column which may also be called the product end of the column.

For any column or bed, the forward direction is defined as the direction from the feed end toward the product end. The backward direction is opposite to the forward direction. For each bed within a column, the feed end of the bed is defined as the end nearest the feed end of the column. The product end of the bed is defined as the end nearest the second end of the column. Forward flow at any point in a column is defined as flow at that point in the forward direction. Backward flow is similarly defined as flow in the backward directions.

The first process step is also referred to as the adsorption step. Its effective mean pressure (which depends on the mean pressures of its substeps) is referred to as the adsorption pressure. During the first process step gas flows are primarily forward flows. During at least some parts of the first process step in a given bed, a feed gas is led into the feed end of the bed. During at least some parts of the first process step in a given bed, gas will flow out of the product end; that gas is defined as the gross product gas for that bed.

The second process step is also referred to as the desorption step. Its effective mean pressure (which depends on the mean pressures of its substeps) is referred to as the desorption pressure. The desorption pressure is always lower than the adsorption pressure. During the second process step gas flows are primarily backward flows. During at least some parts of the second process step in a given bed, a reflux gas is led into the product end of the bed. The reflux gas may, for example, enter as purge during a countercurrent purge substep or it may enter as pressurization gas during a countercurrent pressurization substep. During at least some parts of the second process step in a given bed, gas will flow out of the feed end; that gas is defined as the waste gas.

The two process steps are carried out, one after another, in a cyclic manner in each column of beds within a system of such columns. During cyclic operation there are at any given point in a bed, three total flows to be considered:

a. Total forward flow for a cycle;

b. Total backflow flow for a cycle;

c. Total net flow for a cycle.

The total net flow for a cycle equals the total forward flow for the cycle minus the total backward flow for a cycle. These flows can be expressed in various units of quantity per cycle, for example, total mol/cycle. These three total flows can also be expressed as cycle average flows by dividing the quantity per cycle by the total cycle time (which is the sum of the two process step times). For example, they can be expressed as average rates in mol/s.

Although there are many approaches to design of an adsorption system and PSA process using the present invention, the following procedures and considerations were used to obtain the process date of Table II reflecting the process.

At the outset, certain process conditions were set, namely the adsorption pressure ($P_H$), the desorption pressure ($P_L$), the product flow rate and the net flow temperature ($T_N$). The value for $T_N$ equals the temperature of the feed air, adjusted for any heating or cooling that occurs in the feed end of the adsorber vessel. For steady state operation, $T_N$ is the temperature that the forward flow and the backward flow would have if there were no thermal gradients in the bed. Within these constraints, the first priority in selecting the adsorbents for the various bed layers was to minimize the local reflux ratios in all parts of the bed. The next priority was to maximize local delta loadings and minimize adsorbent costs. At any point in the main bed, the local reflux ratio is the local ratio of backflow to net forward flow. The minimum value of the local reflux ratio (MLRR) is set by the shift in nitrogen concentration that occurs during depressurization from the adsorption pressure to the desorption pressure. It can be calculated using the equation:

$$MLRR = (Y_F - Y_N)/(Y_B - Y_F) \quad (5)$$

wherein $Y_F$ is the local mol fraction of nitrogen in the forward-flowing gas stream; $Y_B$ is the local mol fraction of nitrogen in the backward flowing gas stream; and $Y_N$ is the mol fraction of nitrogen in the net product. In those instances in which the product is essentially free of nitrogen, the equation reduces to:

$$MLRR = Y_F/(Y_B - Y_F) = 1/(Y_B/Y_F - 1) \quad (6)$$

Thus MLRR becomes a simple function of the concentration ratio, $Y_B/Y_F$. The concentration ratio can be found by modeling or experimentation for a given adsorbent and local temperature.

The actual local reflux ratio, ALRR, must be at least somewhat higher than MLRR in order to provide driving forces for the adsorption of nitrogen from the forward-flowing stream and for the desorption of nitrogen into the backward-flowing stream. Also, the ALRR value at any point is constrained by the values at other points through mass balance relations. Typically, the forward flow rate and the backward flow rate each decline with increasing distance from near the feed point to near the product end of the main bed. This occurs because nitrogen contributes heavily to the forward and backward flows near the feed point but contributes little to these flows near the product end. Oxygen flows may be greater near the product end. Oxygen flows may be greater near the product end, but they do not usually make up for the dramatically lower nitrogen flows. As a result, the ALRR can usually be much lower near the product end.

Local temperature depends upon both the intensity of the local temperature fluctuations and on the magnitude of the local ALRR. Where molar heat capacity is nearly constant and uniform, the following equations can be used to determine the local temperatures:

$$T_N = T_F + ALRR * D_T \text{ or } T_F = T_N - ALRR * D_T \qquad (7)$$

wherein $D_T = (T_F - T_B)$; $T_F$ is the local mean temperature of the forward-flowing gas; and $T_B$ is the local mean temperature of the backward-flowing gas. Although the equations appear to be circular, they can be solved by iteration or equivalent methods for any given adsorbent material and local nitrogen concentration. For example, first estimate the value of $T_F$. Then find the local fluctuations in nitrogen concentration and temperature for the given pressure range and operating conditions. Next calculate MLRR and then ALRR from the fluctuation in nitrogen concentration, and calculate a test value of $T_N$ from the $D_T$ and ALRR values. If the test value is too low, then repeat the calculation with a higher value of $T_F$. If the test value is too high, then repeat the calculation with a lower value of $T_F$. In some cases using a lower value of $T_F$ will result in an even higher calculated test value. That will imply unstable operation if that adsorbent material is used at that nitrogen concentration in the design being considered. The adsorbent material should then be rejected for use in that design at that set of local conditions. Stop when continued calculations converge so the test value equals the design TN value. Use the final values of ALRR and any other results as the correct estimate of the local performance of that adsorbent material at that nitrogen concentration. Compare the final calculated values for different adsorbent materials to choose the best one for that nitrogen concentration. Repeat for other points in the range of nitrogen concentrations expected in the separation process, selecting the best adsorbent material for each point.

Two other examples of the application of the instant invention are described below.

For air separation using a nitrogen-selective adsorbent to produce a stream rich in oxygen and argon, each column will contain two beds. The first bed, adjacent to the first end of the column, is the prepurifier bed. It conserves refrigeration and it adsorbs and removes strongly-held impurities such as water vapor and carbon dioxide from the original feed of wet, dirty air.

The main bed contains one or more layers of nitrogen-selective adsorbents to adsorb and remove nitrogen from the forward-flowing stream during the first process step. During at least parts of the first process step, clean, dry air from the prepurifier bed enters the feed end of the main bed, and the gross product rich in oxygen and argon leaves the product end of the main bed. Some of the gross product is selected for use as reflux gas for use in one or more of the columns in the set of columns; part of it may be stored in surge tanks before use as reflux.

During at least part of the second process step a part of the gross product is fed back to the product end of the main bed in the form of purge gas and/or pressurization gas. During at least part of the second process step a waste gas is discharged from the feed end of the second bed into the product end of the purifier bed; it is used in the purifier bed as reflux.

The main bed in each column can be divided into layers, each with a different adsorbent or mix of adsorbents to improve performance at the task of adsorbing and removing nitrogen from the oxygen/argon mixture.

Hydrogen production from a synthesis gas containing such components as hydrogen, nitrogen, argon, carbon oxides, methane, and water vapor may also be carried out in a system of columns divided into beds containing multiple layers. One of the beds could be designed to adsorb and remove, say, the carbon dioxide. Since carbon dioxide is likely to be present at high concentration, a significant temperature gradient is to be expected in the direction of flow. Different layers, each with a different adsorbent or mix of adsorbents can be used to improve performance. Other beds in a column could be similarly subdivided into layers to improve performance.

We claim:

1. In a pressure swing adsorption process for the separation of a more selectively adsorbable component from a feed mixture containing a less selectively adsorbable component, wherein the feed mixture in the vapor phase is contacted in a fixed adsorbent bed containing adsorbent material selective for the adsorption of the more selectively adsorbable component by means of the cyclic steps comprising;

(a) adsorption, during which the feed mixture is passed into the bed in contact with the adsorbent at an upper adsorption pressure and the more selectively adsorbable component of the feed gas mixture is selectively adsorbed and the less selectively adsorbable component thereof is recovered from the discharge end of the bed; and (b) depressurization, during which the passage of the feed mixture into the bed is discontinued and the pressure in the bed is reduced from the upper adsorption pressure to a lower desorption pressure to desorb and recover the more selectively adsorbable component from the bed;

the cyclic operation of steps (a) and (b) producing thermal gradients within said fixed adsorption bed, the improvement in which the feed mixture is contacted with said fixed adsorbent bed wherein said fixed adsorbent bed comprises a composite bed containing at least two different adsorbent materials selective for the adsorption of the more selectively adsorbable component wherein:

i) each of said adsorbents is confined to a zone within the bed in which the temperature and process conditions favor the performance of that adsorbent as determined by measurement of that adsorbent's Adsorption Figure of Merit value under particular process conditions applicable to said zone, wherein the Adsorption Figure of Merit is defined as:

$AFM = \Delta N_2 \alpha_A (\alpha_A / \alpha_D)$, wherein;

$\Delta N_2 = L_{N_A} - L_{N_D}$ is delta N2 loading;

$L_{N_A}$ is nitrogen loading at adsorption conditions;

$L_{N_D}$ is nitrogen loading at desorption conditions;

$$\alpha_A = \left( \frac{L_{N_A}}{L_{O_A}} \right) \left( \frac{1 - Y_{N_A}}{Y_{N_A}} \right)$$

where $\alpha_A$ is selectivity at adsorption conditions;

$L_{O_A}$ is oxygen loading at adsorption conditions;

$Y_{N_A}$ is the gas phase mole fraction of nitrogen at adsorption conditions; and $$\alpha_D = \left(\frac{L_{N_D}}{L_{O_D}}\right)\left(\frac{1-Y_{N_D}}{Y_{N_D}}\right)$$

where $\alpha_D$ is selectivity at desorption conditions $L_{O_D}$ is oxygen loading at desorption conditions and;

$Y_{N_D}$ is the gas mole fraction of nitrogen at desorption conditions; and ii) the bed size for said composite bed is less than the bed size for a bed comprising only one of said adsorbents.

2. In a pressure swing adsorption system for the separation of a more selectively adsorbable component from a feed mixture containing a less selectively adsorbable component, wherein the feed mixture in the vapor phase is contacted in a fixed adsorbent bed containing adsorbent material selective for the adsorption of the more selectively adsorbable component in a cyclic adsorption-depressurization processing sequence, the improvement in which said fixed adsorbent bed comprises a composite bed containing at least two different adsorbent materials selective for the adsorption of the more selectively adsorbable component, wherein:

i) each of said adsorbents is confined to a zone within the bed in which the temperature and process conditions favor the performance of that adsorbent as measured by its Adsorption Figure of Merit value under particular process conditions applicable to said zone, wherein the Adsorption Figure of Merit is defined as:

AFM=$\Delta N_2 \alpha_A (\alpha_A/\alpha_D)$, wherein:

$\Delta N_2 = L_{N_A} - L_{N_D}$ is delta nitrogen loading;

$L_{N_A}$ is nitrogen loading at adsorption conditions;

$L_{N_D}$ is nitrogen loading at desorption conditions;

$$\alpha_A = \left(\frac{L_{N_A}}{L_{O_A}}\right)\left(\frac{1-Y_{N_A}}{Y_{N_A}}\right)$$

where $\alpha_A$ is selectivity at adsorption conditions;

$L_{O_A}$ is oxygen loading at adsorption conditions;

$Y_{N_A}$ is the gas phase mole fraction of nitrogen at adsorption conditions; and $$\alpha_D = \left(\frac{L_{N_D}}{L_{O_D}}\right)\left(\frac{1-Y_{N_D}}{Y_{N_D}}\right)$$

where $\alpha_D$ is selectivity at desorption conditions $L_{O_D}$ is oxygen loading at desorption conditions and;

$Y_{N_D}$ is the gas mole fraction of nitrogen at desorption conditions; and ii) the bed size for said composite bed is less than the bed size for a bed comprising only one of said adsorbents.

* * * * *